2,802,817

MONOAZO DYESTUFFS

Gerhard Dittmar, Leverkusen-Schlebusch, Edgar Enders, Leverkusen-Bayerwerk, and Rolf Pütter, Dusseldorf, Germany, assignors to Farbenfabriken Bayer Aktiengesellschaft, Leverkusen, Germany, a corporation of Germany No Drawing. Application September 29, 1953, Serial No. 383,118

Claims priority, application Germany October 11, 1952

5 Claims. (Cl. 260—151)

The present invention relates to new monoazo dyestuffs and to a method of making the same; more particularly it relates to monoazo dyestuffs corresponding to the following formula

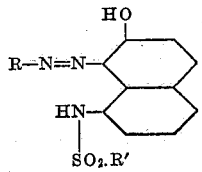

In this formula R—N=N— stands for the radical of a diazo compound of the benzene series free from sulfonic and carboxylic acid groups but bearing in o-position to the —N=N— bridge a group capable of forming metal complex compounds, and R′ means an alkyl radical which may be substituted. The invention further relates to the metal complex compounds of these new dyestuffs, these metal containing compounds being the metal complex compounds either of individual new dyestuffs, of mixtures of these new dyestuffs, or of mixtures of the present dyestuffs with other metallizable dyestuffs.

The new monoazo dyestuffs are obtainable by coupling diazo compounds of the benzene series being free from sulfonic and carboxylic acid groups but bearing in ortho-position to the diazo group a group capable of forming metal complex compounds, with 1-alkylsulfonylamino-7-hydroxynaphthalenes. For reasons of sufficient water-solubility of the new dyestuffs preferably such 1-alkylsulfonylamino-7-hydroxynaphthalenes are used as contain in the alkyl radical a low number of carbon atoms. These alkyl groups may be substituted, as mentioned above, e. g. by chlorine.

The 1-alkylsulfonylamino-7-hydroxynaphthalenes are obtained e. g. by reacting 1-amino-7-hydroxynaphthalene with alkylsulfonic acid chlorides such as methane sulfonyl chloride, chloromethane sulfonyl chloride, ethane sulfonyl chloride, 2-chloroethane sulfonyl chloride-(1), propane sulfonyl chloride in known manner in aqueous or organic medium, e. g. in pyridine.

The new monoazo dyestuffs are suited for dyeing wool by the monochrome process. Dyeings of good to very good fastness properties are thus obtained. The new dyestuffs may also in substance be transformed into their metal complex compounds by the usual methods. E. g. by the action of chrome yielding agents upon a dyestuff or mixtures of dyestuffs of the above constitution or upon mixtures of several dyestuffs containing besides the new monoazo dyestuffs other known chromable dyestuffs, chrome complex compounds are obtained dyeing e. g. wool in equal shades from neutral to weakly acid bath. The dyestuffs are, however, not only suited for dyeing wool, but also for dyeing other animal fibres as well as for dyeing leather, polyamide and polyurethane fibres.

In comparison with analogous azo dyestuffs e. g. known from German Patent 850,038 and containing an alkylcarboylamino group instead of an alkylsulfonylamino group in the radical of the coupling component the new dyestuffs as chrome complex compounds are superior in the fastness to fulling, fastness to acid and partly also in the fastness to light.

The following examples illustrate the present invention without, however, limiting it thereto, the parts being by weight:

EXAMPLE 1

14.4 parts of 1-amino-2-hydroxy-5-chlorobenzene are thoroughly stirred with 200 parts of water and 25 parts of 35% hydrochloric acid and diazotized by adding a solution of 7.6 parts of sodium nitrite in 20 parts of water at 5° C. After one hour the mixture is neutralized with sodium bicarbonate and run into a solution of 26 parts of 1-methyl sulfonylamino-7-hydroxynaphthalene in 150 parts of water, 4 parts of NaOH and 20 parts of anhydrous sodium carbonate at 0 to 5° C. The coupling takes place more rapidly by adding 20 parts of pyridine.

After the coupling is complete the dyestuff which has separated is filtered off and washed several times with a 20% soda solution and a 5% sodium chloride solution. After drying it represents a blue-black powder which dissolves in water with a blue-violet color, in concentrated sulfuric acid with a blue color. The dyestuff dyes wool by the monochrome process fast blue-grey shades.

The new monoazo dyestuff corresponds to the following formula

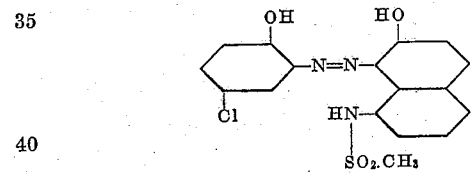

EXAMPLE 2

The dyestuff obtained according to Example 1 is dissolved in 2000 parts of hot water and, after adding 120 parts of a solution of ammonium chrome oxalate containing 2.6% of chromium, heated to the boil.

The solution of the chromium compound used is obtained, for example, by dissolving 717 parts of $Cr_2(SO_4)_3.18H_2O$ with 235 parts of oxalic acid in 3000 parts of water and heating to the boil for 30 minutes. Thereafter the solution is adjusted to pH 8.5 by adding ammonia, and water is added in such a quantity as is necessary to obtain 4000 parts.

From the chroming mixture which is maintained at the boil for about 10 hours, the chromium complex compound of the dyestuff is separated by adding 100 parts of common salt and then filtered. After drying it represents a grey-black powder which dissolves in water with a grey-blue color, in concentrated sulfuric acid with a blue color. The dyestuff dyes wool from a neutral to weakly acid bath equally in fast grey-blue shades.

EXAMPLE 3

The dyestuff obtained according to Example 1 is dissolved in 2000 parts of water and heated to the boil. To this solution are added 115 parts of a cobalt salt solution containing 2.95% of cobalt. This cobalt salt solution can be obtained according in the following way:

281 parts of crystallized cobalt sulfate are dissolved in 1000 parts of water to which are added so many parts of a concentrated aqueous ammonia solution that the precipitate having formed at first dissolves again. Through this solution a strong air current is blown for about 60 minutes. The dark-brown solution obtained is filled up with water to 2000 parts.

The formation of the cobalt complex compound of the dyestuff is complete after a short time. After adding 100 parts of common salt the precipitated dyestuff is filtered off. When dried the dyestuff represents a dark-blue power which dissolves in water with a violet-blue color, in concentrated sulfuric acid with a blue color. It dyes wool from a neutral bath in equal and fast reddish navy blue shades.

EXAMPLE 4

14.4 parts of 1-amino-2-hydroxy-5-chlorobenzene are diazotized in the same manner as described in Example 1 and run into a solution of 29 parts of 1-propylsulfonylamino-7-hydroxynaphthalene in 200 parts of water, 4 parts of NaOH and 20 parts of anhydrous sodium carbonate. After 10 hours the precipitated dyestuff is filtered off and is converted in known manner into its chromium complex compound. After drying the dyestuff represents a grey-black powder which dissolves in water with a grey-blue color, in concentrated sulfuric acid with a blue color. It dyes wool from neutral to weakly acid bath in equal and fast blue-grey shades.

The new monoazo dyestuff corresponds to the following formula

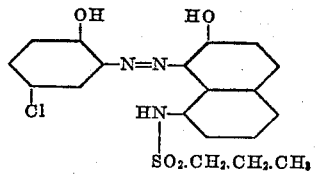

EXAMPLE 5

14.4 parts of 1-amino-2-hydroxy-5-chlorobenzene are diazotized in the same manner as described in Example 1 and run into a solution of 32 parts of 1-β-chloroethyl sulfonylamino-7-hydroxynaphthalene in 200 parts of water, 4 parts of NaOH and 20 parts of anhydrous sodium carbonate at 0 to 10° C. After 10 hours the separated dyestuff is filtered off. After drying it represents a grey powder which dissolves in water with a grey color, in concentrated sulfuric acid with a reddish blue color. By the monochrome process the dyestuff dyes wool neutral grey shades.

The new monoazo dyestuff corresponds to the following formula

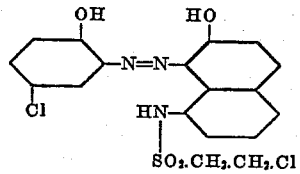

The dyestuff can be converted in known manner into its chromium complex compound which dissolves in water with a grey color, in concentrated sulfuric acid with a blue-grey color. It dyes wool from a neutral to weakly acid bath, equal and fast grey shades.

When using in the above example instead of 32 parts of 1-β-chloroethyl sulfonylamino-7-hydroxynaphthalene 31 parts of 1-chloromethyl sulfonylamino-7-hydroxynaphthalene, a dyestuff with similar properties is obtained.

Similar dyeings and fastness properties are shown by dyestuffs which are obtained if instead of the 1-amino-2-hydroxy-5-chlorobenzene used in Examples 1 to 5 the amines stated in column 2 of the following table are used as diazo component and otherwise the process is carried out in analogous manner. In the examples of the table the 1-methylsulfonylamino-7-hydroxynaphthalene is used as coupling component.

Table

| Example | Diazo component | Color of dyestuff solution in— | | Shade on wool dyed from neutral to weakly acid bath with dyestuff chromed in substance |
|---|---|---|---|---|
| | | water | H₂SO₄, 66° Bé. | |
| 6 | 1-amino-2-hydroxy-4-nitrobenzene. | blue | green-blue | greenish blue. |
| 7 | 1-amino-2-hydroxy-5-nitrobenzene. | blue-violet | violet-blue | olive. |
| 8 | 1-amino-2-hydroxy-3,5-dichlorobenzene. | violet-blue | blue | grey-blue. |
| 9 | 1-amino-2-hydroxy-3,5-dinitrobenzene. | do | blue-green | olive. |
| 10 | 1-amino-2-hydroxy-benzene-4-sulfonamide. | violet | do | blue-grey. |
| 11 | 1-amino-2-hydroxy-3-chloro-5-nitrobenzene. | blue-violet | blue | olive. |
| 12 | 1-amino-2-hydroxy-3-nitro-5-chlorobenzene. | violet-blue | do | grey-blue. |

EXAMPLE 13

20 parts of the dyestuff according to Example 1 and 22 parts of the dyestuff according to Example 7 are dissolved in 1500 parts of hot water and, after adding 120 parts of an ammonium chrome oxalate solution containing 2.6% of chromium, heated to the boil for 4 hours. 50 parts of common salt are added thereto and the precipitated dyestuff is filtered off. After drying it represents a black-blue powder which dissolves in water with a blue-green color, in concentrated sulfuric acid with a blue color. It dyes wool from a neutral bath in equal and fast greenish blue-grey shades.

EXAMPLE 14

22 parts of the dyestuff obtained in known manner by coupling diazotized 1-amino-2-hydroxybenzene-5-sulfonamide with 1-(2',5'-dichlorophenyl)-3-methyl-5-pyrazolone are dissolved with 20 parts of the dyestuff according to Example 1 in 1500 parts of water and heated to the boil. 130 parts of a solution of ammonium chrome oxalate containing 2.6% of chromium are added thereto. The boiling temperature is maintained for about 7 hours. The solution is then neutralized to pH 7.5 by adding acetic acid and the separation of the chromium complex compound formed is completed by adding 150 parts of common salt; the dyestuff is filtered. After drying the dyestuff obtained represents a brown powder which dissolves in water with a brown color, in concentrated sulfuric acid with a green color. It dyes wool from a neutral to weakly acid bath in fast brown shades.

We claim:

1. Dyestuffs selected from the group consisting of monoazo dyestuffs corresponding to the formula

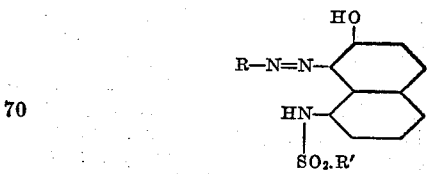

wherein R stands for a radical of the benzene series being free from sulfonic and carboxylic acid group but bearing in ortho-position to the —N=N— bridge a group capable of forming metal complex compounds and R' stands for a radical selected from the group consisting of lower alkyl radicals and their chloro-substitution products, and the chromium and cobalt complex compounds thereof.

2. Dyestuffs selected from the group consisting of monoazo dyestuffs corresponding to the formula

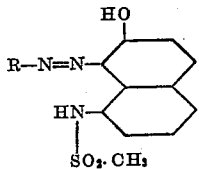

wherein R stands for a radical of the benzene series being free from sulfonic and carboxylic acid group but bearing in ortho-position to the —N=N— bridge a group capable of forming chromium and cobalt complex compounds, and the metal complex compounds thereof.

3. A dyestuff selected from the group consisting of the monoazo dyestuff corresponding to the formula

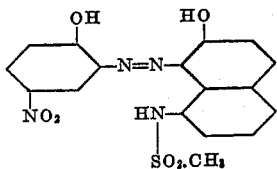

and the chrome complex thereof.

4. A dyestuff selected from the group consisting of the monoazo dyestuff corresponding to the formula

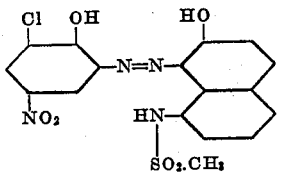

and the chrome complex thereof.

5. A dyestuff selected from the group consisting of the monoazo dyestuff corresponding to the formula

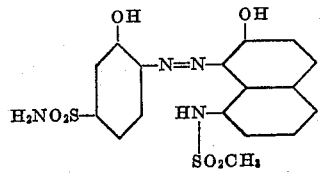

and the chrome complex thereof.

References Cited in the file of this patent
UNITED STATES PATENTS

| | | |
|---|---|---|
| 2,064,332 | Zwilgmeyer | Dec. 15, 1936 |
| 2,347,928 | Bonhote et al. | May 2, 1944 |
| 2,353,675 | Knecht | July 18, 1944 |
| 2,610,175 | Widmer et al. | Sept. 9, 1952 |